Nov. 14, 1950          G. PRODROMOS          2,529,963
                   HOLDER FOR TRIMMING TOOLS
Filed Dec. 26, 1947                      2 Sheets-Sheet 1
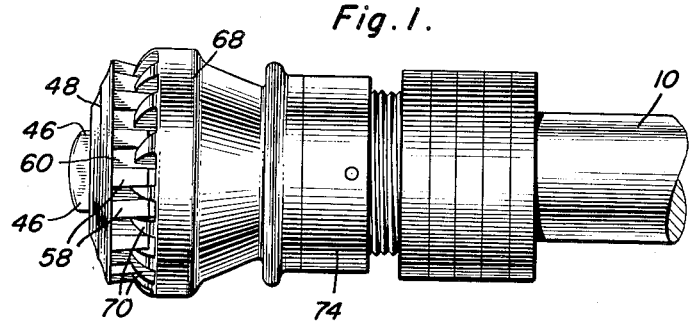
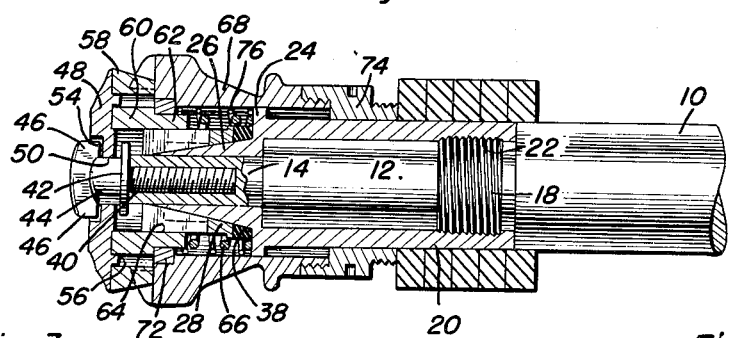
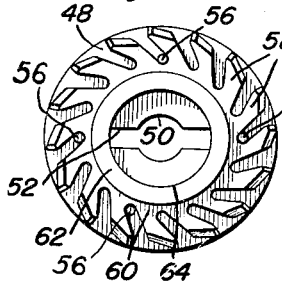 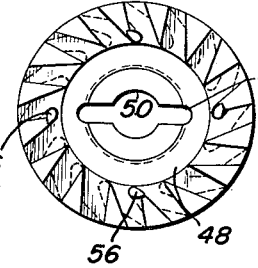 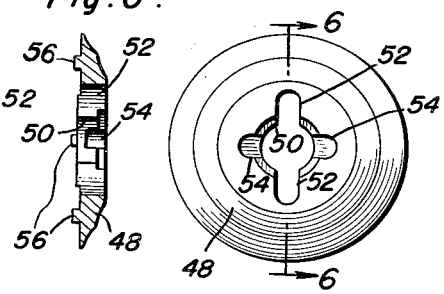
George Prodromos
         INVENTOR.
BY *Clarence A. O'Brien*
   *and Harvey B. Jacobson*
                    Attorneys Nov. 14, 1950 G. PRODROMOS 2,529,963
HOLDER FOR TRIMMING TOOLS
Filed Dec. 26, 1947 2 Sheets-Sheet 2
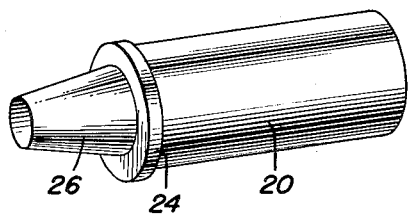
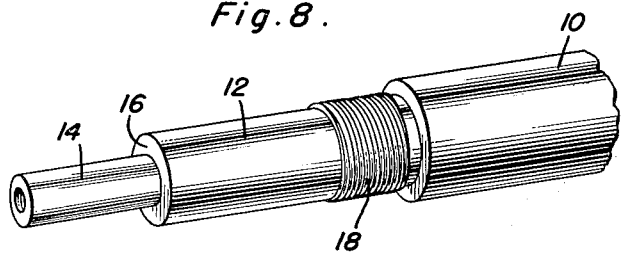
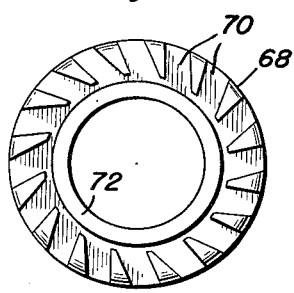
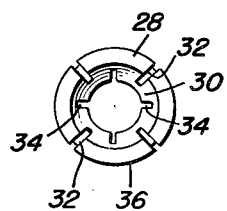
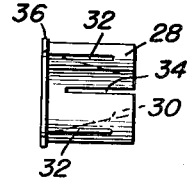
George Prodromos
INVENTOR.

Patented Nov. 14, 1950

2,529,963

UNITED STATES PATENT OFFICE 2,529,963

HOLDER FOR TRIMMING TOOLS

George Prodromos, Winston-Salem, N. C.

Application December 26, 1947, Serial No. 793,792

6 Claims. (Cl. 12—88)

This invention relates to a holder for an annular tool such as a trimming tool of the type employed in the manufacture and repair of shoes.

The primary object of the invention is to facilitate the rapid interchange of tools for performing various services.

Another object is to enable the user quickly to remove a dull tool from the holder and replace it with a sharpened tool.

A still further object is to assure positive driving connection between the annular tool, and the spindle upon which it is mounted.

The above and other objects may be attained by employing this invention which embodies among its features a shaft rotatable about its longitudinal axis, latch means at one end of the shaft detachably to hold an annular tool in shaft-encircling position, a conical sleeve mounted on the shaft to move longitudinally thereof and an expansible collar encircling the sleeve and entering the bore of the annular tool held in shaft-encircling position by the latch means so that upon the advance of the sleeve into the collar, the tool will be frictionally bound to the shaft.

Still other features include an annular head encircling the shaft adjacent the cutter for rotation therewith, a hub extending axially from the cutter for supporting one end of the annular head, and means yieldingly urging the annular head into cutter-engaging position.

In the drawings:

Figure 1 is a side view of a tool holder embodying the features of this invention, Figure 2 is a vertical sectional view through the tool holder, Figure 3 is an end view of the inner end of the cutter showing the cutter guard in place on the outer end thereof, Figure 4 is a plan view of the inner face of the cutter guard, Figure 5 is an end view of the outer face of the cutter guard, Figure 6 is a sectional view taken substantially along the line 6—6 of Figure 5, Figure 7 is a perspective view of the longitudinally movable sleeve, illustrating the conical sleeve formed at the end thereof, Figure 8 is a fragmentary perspective view of the end of the drive shaft upon which the tool is mounted, Figure 9 is an end view of the annular head, Figure 10 is an end view of the expansible collar, and Figure 11 is a side view of the collar illustrated in Figure 10.

Referring to the drawings in detail, a shaft 10 is mounted to rotate about its longitudinal axis in a conventional shoe machine and this shaft is provided at one end with an axial extension 12 forming a cylindrical portion of reduced diameter. Extending axially from the end of the cylindrical portion 12 remote from the shaft 10 is a cylindrical spindle 14 of reduced diameter which forms, in conjunction with the extension 12, an annular shoulder 16. The cylindrical portion 12 is provided near the end remote from the spindle 14 with external screw threads 18, the purpose of which will more fully hereinafter appear. Encircling the cylindrical extension 12 is a cylindrical sleeve 20 which is provided with internal screw threads 22 for cooperation with the threads 18 in moving the sleeve longitudinally with relation to the shaft 10. The end of the sleeve remote from the threaded end 22 which encircles the threads 18 on the shaft is provided with an outstanding annular flange 24, and extending axially from the flanged end of the sleeve 20 is a conical sleeve 26 which, when the parts are assembled, encircles the spindle 14, as will be readily understood upon reference to Figure 2. The outer diameter of the sleeve 20 is substantially equivalent to that of the shaft 10, so that the flange 24 will be of slightly greater diameter than that of the sleeve or the shaft.

Encircling the conical sleeve 26 is an expansible collar 28 which is provided with a conical bore 30, the slope of which corresponds to the slope of the conical sleeve 26 and formed in the collar 28 are longitudinally extending, radially spaced, elongated slots 32 which open through the end of the collar adjacent the divergent end of the bore 30, while similar elongated radially spaced longitudinally extending slots 34 enter the opposite end of the collar so that as the conical sleeve 26 is entered into the collar, the latter will be expanded substantially concentrically about its longitudinal axis. An outstanding annular flange 36 is formed on the collar 28 adjacent the end through which the divergent end of the tapered opening 30 opens to form a bearing surface on the end of the collar for engagement against a suitable cushioning ring 38 which surrounds the conical sleeve 26 adjacent its junction with the cylindrical sleeve 20. The outer circumference of the collar 28 is preferably concentric about its longitudinal axis so as to form a bearing for an annular tool to be mounted on the shaft.

Threaded axially into the end of the spindle 14 remote from its junction with the cylindrical extension 12 is a stud 40 carrying an outstanding annular flange 42, which, when the stud is entered into the spindle 14 to its fullest extent, bears against the end of the spindle and forms a stop to prevent the expansible collar 28 from moving longitudinally off of the end of the spindle as the conical sleeve is advanced thereinto. Formed on the stud on the side of the flange 42 remote from the threaded portion of said stud is a cylindrical head 44 carrying adjacent its outer end a pair of diametrically opposed, outwardly extending lugs 46. A cutter guard 48 is provided with an axial opening 50 of a diameter to readily fit over the cylindrical portion 44 of the stud and this cutter guard is provided with diametrically opposed slots 52 which open into the opening 50 so that the cutter guard may be positioned on the cylindrical portion 44 of the stud 40 by passing the lugs 46 through the slots 52. Formed in the outer face of the cutter guard 48 are diametrically opposed recesses 54, the longitudinal axes of which lie perpendicular to the longitudinal axes of the slots 52, so that by turning the cutter guard about the axis of the cylindrical portion 44, the lugs 46 may be made to engage in the recesses 54, to latch the cutter guard in place. Formed on the inner face of the cutter guard at radially spaced intervals are lugs 56 which project perpendicularly from the inner face of the cutter guard and are adapted to engage between the teeth 58 of a rotary cutting tool 60 which is provided with a cylindrical hub portion 62 and an axial bore 64 in which the expansible collar 28 is received. It will thus be seen that the cutter 60 may be removably supported on the expansible collar 28 by the engagement of the lugs 46 in the recesses 54 of the cutter guard 48, and also by reason of the engagement of the lugs 46 with the walls of the recesses 54 in the cutter guard 48, and the engagement of the lugs 56 between the teeth 58 of the cutter 60, the cutter will be driven in unison with the shaft 10 when the latter is rotated. It will be understood, of course, that the threads joining the stud 40 with the spindle 14 are preferably left-hand threads, or at least are cut in such a manner as to avoid the unscrewing of the stud from the spindle when the shaft 10 is rotated in a normal direction.

In the preferred form of the invention, a compression coil spring 66 encircles the cushion 38 and the expansible collar 28, with one end bearing on the shoulder formed by the junction of the conical sleeve 26 with the cylindrical sleeve 20, and the other end bearing against the inner end of the hub 62 so as to yieldingly urge the cutter 60 and cutter guard 48 toward the end of the spindle 14 remote from the shaft 10. In this way, the cutter head is yieldingly held against the lugs 46 and the quick disassembling of the parts is facilitated.

Encircling the flange 24 is an annular head 68 carrying adjacent its forward end spaced teeth 70 which are adapted to mesh with the teeth 58 of the cutter 60. The end of the annular head 68 adjacent the cutter 60 is equipped with an internal bushing 72 which encircles the hub 62 and forms a support by which the head 68 is held in concentric relation to the cutter 60. A supporting collar 74 is threaded onto the end of the head 68 remote from the teeth 70 and encircles the sleeve 20. to form a support for the end of the head 68 remote from the cutter 60 and assure the maintenance of the concentricity of the head 68.

The tool holder is assembled by unscrewing the stud 40 from the spindle 14 and slipping the sleeve 20 over the cylindrical extension 12 so that the conical sleeve 26 encircles the spindle and may be shifted longitudinally thereon by rotating the sleeve 20 with relation to the shaft 10. The expansible collar is next slipped into place over the end of the spindle 14 so that the slope of the conical bore 30 coincides with that of the conical sleeve 26. The stud 40 is then returned to its position in the end of the spindle 14 and the head 68 is mounted on the sleeve 20 by unscrewing the supporting member 74, and slipping the rear end of the head over the flange 24, after which the head and supporting member are again threadedly joined. A compression coil spring 76 encircles the coil spring 66 and one end bears against the flange 24, while the opposite end of the spring 76 bears against the bushing 72 in order yieldingly to hold the head 68 against the cutter 60. With the parts thus assembled, the cutter 60 is slipped into place to encircle the expansible collar 28, and the hub 62 of the cutter is entered into the bushing 72 of the head 68. Under the influence of the springs 66 and 76, the cutter 60 will be yieldingly urged toward the end of the spindle 14 remote from the shaft 10 and upon placing the cutter guard 48 in the position illustrated with the lugs 56 entering the spaces between the teeth 58, it will be evident that by properly positioning the cutter guard 48, the lugs 46 may be passed through the slots 52 and upon rotating the cutter guard, the cutter and the head relative to the shaft through a 90° arc, the lugs 46 will enter the recesses 54 and thus latch the parts in proper place, with the springs 66 and 76 urging the cutter and head respectively toward the cutter guard 48. Having thus mounted the cutter and head in place, positive driving connection between the shaft and the cutter may be had by turning the sleeve 20 to advance the conical sleeve 26 into the expansible collar 28 so as to cause it to expand against the wall of the bore 64 in the cutter.

When it is desired to remove a cutter for sharpening or to substitute one cutter for another cutter or rotary tool, it is but necessary to rotate the cylindrical sleeve 20 in a direction to retract it relative to the shaft 10 and thereby withdraw the conical sleeve 26 from engagement with the conical bore 30 of the collar 28, thus freeing the cutter 60 and by pressing inwardly on the guard 48 and rotating the guard and cutter 60 through an arc of 90°, the lugs 46 will align with the slots 52 to allow the guard 48 and cutter 60 to be removed from the holder. When the parts are assembled, the effort of the springs 66 and 76 will effectively retain the cutter 60 against the cutter guard 48 and the head 68 against the cutter.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. In a rotary cutting tool an elongated shaft mounted to rotate about its longitudinal axis, a sleeve encircling the shaft and threadedly engaged therewith adjacent one end thereof, a hollow conical projection on the sleeve, said projection extending axially from the sleeve, at the end thereof remote from the shaft, a spindle carried by the shaft and extending axially therefrom through the conical projection on the sleeve, an expansible collar mounted on the conical projection for entering the bore in a cutter and supporting the cutter on the shaft and a cutter guard carried by the spindle and detachably connected thereto at the end thereof remote from the shaft for holding the cutter against endwise movement when the sleeve is rotated about the shaft to advance the conical projection toward the cutter and expand the collar.

2. In a rotary cutting tool an elongated shaft mounted to rotate about its longitudinal axis, a sleeve encircling the shaft and threadedly engaged therewith adjacent one end thereof, a spindle carried by the shaft and extending axially from one end thereof, said spindle being rotated by the shaft, a conical projection on the sleeve encircling the spindle, an expansible collar mounted on the conical projection, a rotary cutter mounted on the collar, a cutter guard mounted on the spindle at the end thereof remote from the shaft for rotation thereby and means carried by the cutter guard and engaging the cutter for establishing driving connection between the cutter guard and the cutter.

3. In a rotary cutting tool an elongated shaft mounted to rotate about its longitudinal axis, a sleeve encircling the shaft and threadedly engaged therewith adjacent one end thereof, a spindle carried by the shaft and extending axially from one end thereof, said spindle being rotated by the shaft, a conical projection on the sleeve encircling the spindle, an expansible collar mounted on the conical projection, a rotary cutter mounted on the collar, a cutter guard mounted on the spindle at the end thereof remote from the shaft, a spring encircling the collar and bearing on the cutter to urge the cutter into yielding contact with the cutter guard.

4. In a rotary cutting tool an elongated shaft mounted to rotate about its longitudinal axis, a sleeve encircling the shaft and threadedly engaged therewith adjacent one end thereof, a spindle carried by the shaft and extending axially from one end thereof, said spindle being rotated by the shaft, a conical projection on the sleeve encircling the spindle, an expansible collar mounted on the conical projection, a rotary cutter mounted on the collar, a cutter guard mounted on the spindle at the end thereof remote from the shaft, a spring encircling the collar and bearing on the cutter to urge the cutter into yielding contact with the cutter guard, and means carried by the cutter guard and engaging the cutter for establishing driving connection between the cutter guard and the cutter.

5. In a rotary cutting tool an elongated shaft mounted to rotate about its longitudinal axis, a sleeve encircling the shaft and threadedly engaged therewith adjacent one end thereof, a hollow conical projection on the sleeve, said projection extending axially from the sleeve, at the end thereof remote from the shaft, a spindle carried by the shaft and extending axially therefrom through the conical projection on the sleeve, an expansible collar mounted on the conical projection for entering the bore in a cutter and supporting the cutter on the shaft, a cutter guard carried by the spindle and detachably connected thereto at the end thereof remote from the shaft for holding the cutter against endwise movement when the sleeve is rotated about the shaft to advance the conical projection toward the cutter and expand the collar, a cutter head mounted on the shaft in encircling relation to the conical projection, and end cutting teeth on the cutter head and engaging the cutter for establishing driving connection between the cutter and the cutter head.

6. In a rotary cutting tool an elongated shaft mounted to rotate about its longitudinal axis, a sleeve encircling the shaft and threadedly engaged therewith adjacent one end thereof, a spindle carried by the shaft and extending axially from one end thereof, said spindle being rotated by the shaft, a conical projection on the sleeve encircling the spindle, an expansible collar mounted on the conical projection, a rotary cutter mounted on the collar, a cutter guard mounted on the spindle at the end thereof remote from the shaft for rotation thereby, means carried by the cutter guard and engaging the cutter for establishing driving connection between the cutter guard and the cutter, a cutter head mounted on the shaft in encircling relation to the conical projection and end cutting teeth on the end of said cutter head remote from the shaft, said teeth engaging the rotary cutter and establishing driving connection between the rotary cutter and the cutter head.

GEORGE PRODROMOS.

REFERENCES CITED

The following references are of record in the file of this patent:

UNITED STATES PATENTS

| Number | Name | Date |
| --- | --- | --- |
| 168,849 | Sirret | Oct. 19, 1875 |
| 599,166 | Cromer | Feb. 15, 1898 |
| 1,797,296 | Ray | Mar. 24, 1931 |